(12) United States Patent
Suciu et al.

(10) Patent No.: US 9,850,819 B2
(45) Date of Patent: Dec. 26, 2017

(54) INTERCOOLED COOLING AIR WITH DUAL PASS HEAT EXCHANGER

(71) Applicant: United Technologies Corporation, Hartford, CT (US)

(72) Inventors: Gabriel L. Suciu, Glastonbury, CT (US); Jesse M. Chandler, South Windsor, CT (US); Joseph Brent Staubach, Colchester, CT (US); Brian D. Merry, Andover, CT (US); Wesley K. Lord, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 558 days.

(21) Appl. No.: 14/695,504

(22) Filed: Apr. 24, 2015

(65) Prior Publication Data

US 2016/0312704 A1    Oct. 27, 2016

(51) Int. Cl.
*F01D 25/12*    (2006.01)
*F02C 7/18*     (2006.01)
(Continued)

(52) U.S. Cl.
CPC .............. *F02C 7/185* (2013.01); *F01D 25/12* (2013.01); *F02C 3/13* (2013.01); *F02C 7/143* (2013.01);
(Continued)

(58) Field of Classification Search
CPC .......... F01D 25/12; F02C 7/185; F02C 7/143; F05D 2260/211; F05D 2260/213; F05D 2260/606
See application file for complete search history.

(56) References Cited

U.S. PATENT DOCUMENTS

| 2,692,476 A | 10/1954 | Schaal et al. |
| 5,163,285 A * | 11/1992 | Mazeaud ................. F01D 5/08 60/806 |

(Continued)

FOREIGN PATENT DOCUMENTS

| EP | 0608142 A1 | 7/1994 |
| EP | 0903484 A2 | 3/1999 |

(Continued)

OTHER PUBLICATIONS

European Search Report for European Application No. 16166707.6 dated Sep. 26, 2016.

(Continued)

*Primary Examiner* — Ninh H Nguyen
(74) *Attorney, Agent, or Firm* — Carlson, Gaskey & Olds, PC

(57) ABSTRACT

A gas turbine engine comprises a main compressor section having a downstream most end, and more upstream locations. A turbine section has a high pressure turbine. A tap taps air from at least one of the more upstream locations in the compressor section, passes the tapped air through a heat exchanger and then to a cooling compressor. The cooling compressor compresses ng air downstream of the heat exchanger, and delivers air into the high pressure turbine. The heat exchanger has at least two passes, with one of the passes passing air radially outwardly, and a second of the passes returning the air radially inwardly to the compressor. An intercooling system for a gas turbine engine is also disclosed.

10 Claims, 4 Drawing Sheets

(51) Int. Cl.
  *F02C 7/143* (2006.01)
  *F02C 3/13* (2006.01)
(52) U.S. Cl.
  CPC .. *F05D 2210/44* (2013.01); *F05D 2220/3212* (2013.01); *F05D 2220/3218* (2013.01); *F05D 2260/211* (2013.01); *F05D 2260/213* (2013.01); *F05D 2260/606* (2013.01); *Y02T 50/676* (2013.01)

(56) References Cited

U.S. PATENT DOCUMENTS

| | | | |
|---|---|---|---|
| 5,724,806 A | 3/1998 | Horner | |
| 5,758,485 A | 6/1998 | Frutschi | |
| 6,050,079 A | 4/2000 | Durgin et al. | |
| 6,134,880 A | 10/2000 | Yoshinaka | |
| 6,430,931 B1 | 8/2002 | Horner | |
| 7,284,377 B2 | 10/2007 | Joshi et al. | |
| 8,826,675 B2 * | 9/2014 | Rodriguez | H02K 9/12 62/62 |
| 9,188,009 B2 * | 11/2015 | Yilmaz | F02C 7/12 |
| 9,222,411 B2 * | 12/2015 | Sennoun | F02C 7/185 |
| 9,239,005 B2 * | 1/2016 | Strecker | B64D 13/06 |
| 2003/0046938 A1 | 3/2003 | Mortzheim et al. | |
| 2009/0196736 A1 | 8/2009 | Sengar et al. | |
| 2013/0098059 A1 | 4/2013 | Suciu et al. | |
| 2014/0196469 A1 | 7/2014 | Finney et al. | |

FOREIGN PATENT DOCUMENTS

| | | |
|---|---|---|
| FR | 2851295 | 8/2004 |
| GB | 1244340 A | 8/1971 |
| WO | 2014092777 A1 | 6/2014 |

OTHER PUBLICATIONS

European Search Report for European Patent Application No. 16154635.3 dated Jul. 6, 2016.
European Search Report for European Patent Application No. 16166724.1 dated Sep. 26, 2016.

* cited by examiner

INTERCOOLED COOLING AIR WITH DUAL PASS HEAT EXCHANGER

BACKGROUND

This application relates to improvements in providing cooling air from a compressor section to a turbine section in a gas turbine engine.

Gas turbine engines are known and typically include a fan delivering air into a bypass duct as propulsion air. Further, the fan delivers air into a compressor section where it is compressed. The compressed air passes into a combustion section where it is mixed with fuel and ignited. Products of this combustion pass downstream over turbine rotors driving them to rotate.

It is known to provide cooling air from the compressor to the turbine section to lower the operating temperatures in the turbine section and improve overall engine operation. Typically, air from the downstream most end of the compressor has been tapped, passed through a heat exchanger, which may sit in the bypass duct and then delivered into the turbine section. The air from the downstream most end of the compressor section is at elevated temperatures.

SUMMARY

In a featured embodiment, a gas turbine engine comprises a main compressor section having a downstream most end, and more upstream locations. A turbine section has a high pressure turbine. A tap taps air from at least one of the more upstream locations in the compressor section, passes the tapped air through a heat exchanger and then to a cooling compressor. The cooling compressor compresses ng air downstream of the heat exchanger, and delivers air into the high pressure turbine. The heat exchanger has at least two passes, with one of the passes passing air radially outwardly, and a second of the passes returning the air radially inwardly to the compressor.

In another embodiment according to the previous embodiment, a main fan delivers bypass air into a bypass duct and into the main compressor section and the heat exchanger positioned within the bypass duct to be cooled by bypass air.

In another embodiment according to the any of the previous embodiments, the cooling compressor includes a centrifugal compressor impeller.

In another embodiment according to the any of the previous embodiments, the first pass is positioned upstream of the second pass in the bypass duct.

In another embodiment according to the any of the previous embodiments, the first pass is positioned upstream of the second pass in the bypass duct.

In another embodiment according to the any of the previous embodiments, the at least one of the more upstream locations is in a high pressure compressor.

In another embodiment according to the any of the previous embodiments, the at least one of the more upstream locations is in a low pressure compressor.

In another embodiment according to the any of the previous embodiments, an auxiliary fan is positioned upstream of the heat exchanger.

In another embodiment according to the any of the previous embodiments, the at least one of the more upstream locations is in a high pressure compressor.

In another embodiment according to the any of the previous embodiments, the at least one of the more upstream locations is in a low pressure compressor.

In another featured embodiment, an intercooling system for a gas turbine engine comprises a heat exchanger for cooling air drawn from a portion of a main compressor section at a first temperature and pressure for cooling the air to a second temperature cooler than the first temperature. A cooling compressor compresses air communicated from the heat exchanger to a second pressure greater than the first pressure and communicating the cooling air to a portion of a turbine section. The heat exchanger has at least two passes, with one of the passes passing air radially outwardly, and a second of the passes returning the air radially inwardly to the compressor.

In another embodiment according to the previous embodiment, an auxiliary fan is positioned upstream of the heat exchanger.

In another embodiment according to the any of the previous embodiments, a main fan delivers bypass air into a bypass duct and into the main compressor section and the heat exchanger positioned within the bypass duct to be cooled by bypass air.

In another embodiment according to the any of the previous embodiments, the cooling compressor includes a centrifugal compressor impeller.

In another embodiment according to the any of the previous embodiments, the first pass is positioned upstream of the second pass in the bypass duct.

In another embodiment according to the any of the previous embodiments, the first pass is positioned upstream of the second pass in the bypass duct.

In another embodiment according to the any of the previous embodiments, the at least one of the more upstream locations is in a high pressure compressor.

In another embodiment according to the any of the previous embodiments, the at least one of the more upstream locations is in a low pressure compressor.

In another embodiment according to the any of the previous embodiments, the at least one of the more upstream locations is in a high pressure compressor.

In another embodiment according to the any of the previous embodiments, the at least one of the more upstream locations is in a low pressure compressor.

These and other features may best be understood from the following specification and drawings, the following of which is a brief description.

DETAILED DESCRIPTION

Figure 1:
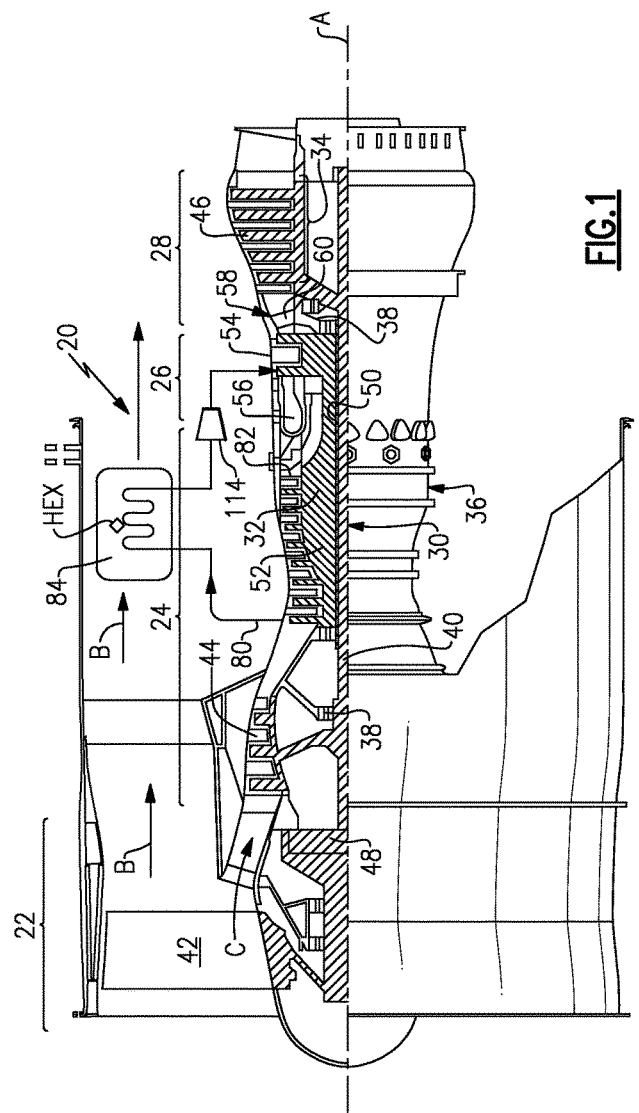
FIG. 1 schematically shows a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °\ R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Gas turbine engines designs are seeking to increase overall efficiency by generating higher overall pressure ratios. By achieving higher overall pressure ratios, increased levels of performance and efficiency may be achieved. However, challenges are raised in that the parts and components associated with a high pressure turbine require additional cooling air as the overall pressure ratio increases.

The example engine 20 utilizes air bleed 80 from an upstream portion of the compressor section 24 for use in cooling portions of the turbine section 28. The air bleed is from a location upstream of the downstream end 82 of the compressor section 24. The bleed air passes through a heat exchanger 84 to further cool the cooling air provided to the turbine section 54. The air passing through heat exchanger 84 is cooled by the bypass air B. That is, heat exchanger 84 is positioned in the path of bypass air B. As better described below, a booster compressor 114 helps drive the air.

Figure 2:
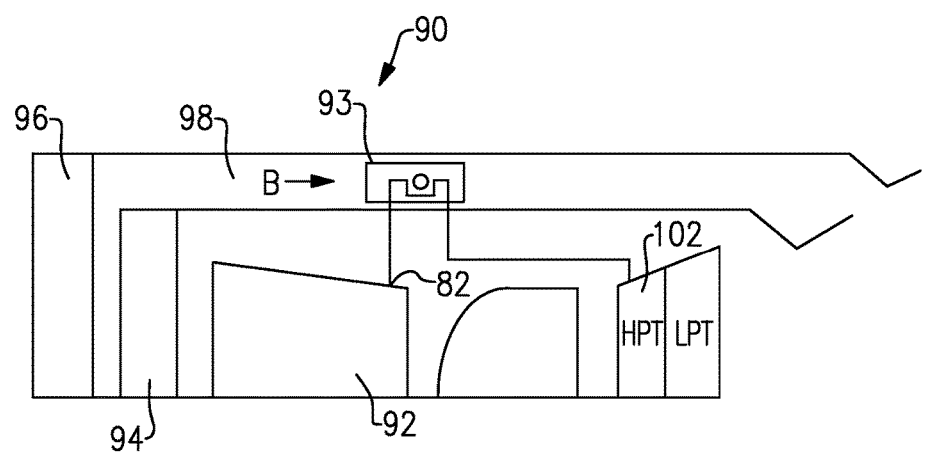
FIG. 2 shows a prior art engine.

A prior art approach to providing cooling air is illustrated in FIG. 2. An engine 90 incorporates a high pressure compressor 92 downstream of the low pressure compressor 94. As known, a fan 96 delivers air into a bypass duct 98 and into the low pressure compressor 94. A downstream most point 82 in the high pressure compressor 92 provides bleed air into a heat exchanger 93. The heat exchanger is in the path of the bypass air in bypass duct 98, and is cooled. This high pressure high temperature air from location 82 is delivered into a high pressure turbine 102.

The downstream most point 82 of the high pressure compressor 82 is known as station 3. The temperature T3 and pressure P3 are both very high.

In future engines, T3 levels are expected to approach greater than or equal to 1350° F. Current heat exchanger technology is becoming a limiting factor as they are made of materials, manufacturing, and design capability which have difficulty receiving such high temperature levels.

Figure 3:
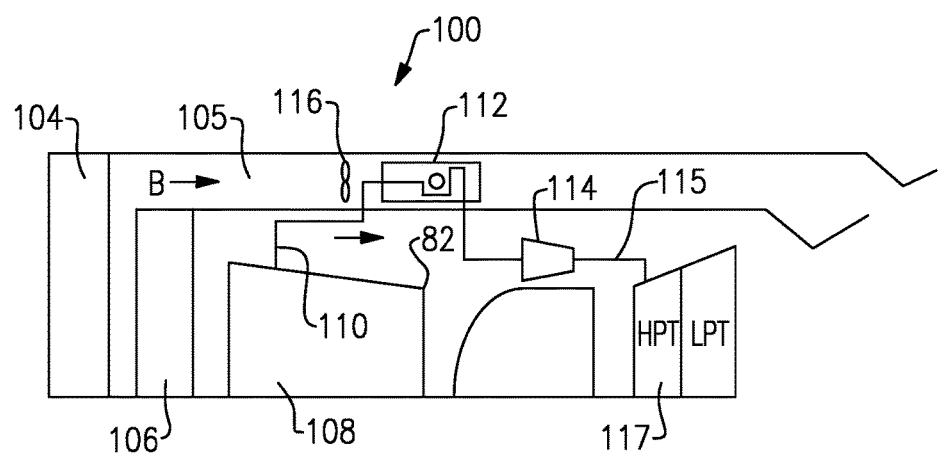
FIG. 3 shows one example engine.

FIG. 3 shows an engine 100 coming within the scope of this disclosure. A fan 104 may deliver air B into a bypass duct 105 and into a low pressure compressor 106. High pressure compressor 108 is positioned downstream of the low pressure compressor 106. A bleed 110 taps air from a location upstream of the downstream most end 82 of the high pressure compressor 108. This air is at temperatures and pressures which are much lower than T3/P3. The air tapped at 110 passes through a heat exchanger 112 which sits in the bypass duct 105 receiving air B. Further, the air from the heat exchanger 112 passes through a compressor 114, and then into a conduit 115 leading to a high turbine 117. This structure is all shown schematically.

Since the air tapped at point 110 is at much lower pressures and temperatures than the FIG. 2 prior art, currently available heat exchanger materials and technology may be utilized. This air is then compressed by compressor 114 to a higher pressure level such that it will be able to flow into the high pressure turbine 117.

An auxiliary fan 116 is illustrated upstream of the heat exchanger 112. The main fan 104 may not provide sufficient pressure to drive sufficient air across the heat exchanger 112. The auxiliary fan 116 will ensure there is adequate air flow in the circumferential location of the heat exchanger 112.

In one embodiment, the auxiliary fan 116 may be variable speed, with the speed of the fan varied to control the temperature of the air downstream of the heat exchanger 112. As an example, the speed of the auxiliary fan 116 may be varied based upon the operating power of the overall engine.

Further details of the basic system may be found in co-pending patent application Ser. No. 14/695,578, entitled "Intercooled Cooling Air," and filed on even date herewith, which application is hereby incorporated in its entirety by reference.

Details with regard to an optional arrangement may be found in co-pending patent application Ser. No. 14/695,534, entitled "Intercooled Cooling Air With Plural Tap Locations," and filed on even date herewith, which application is hereby incorporated in its entirety by reference.

Figure 4:
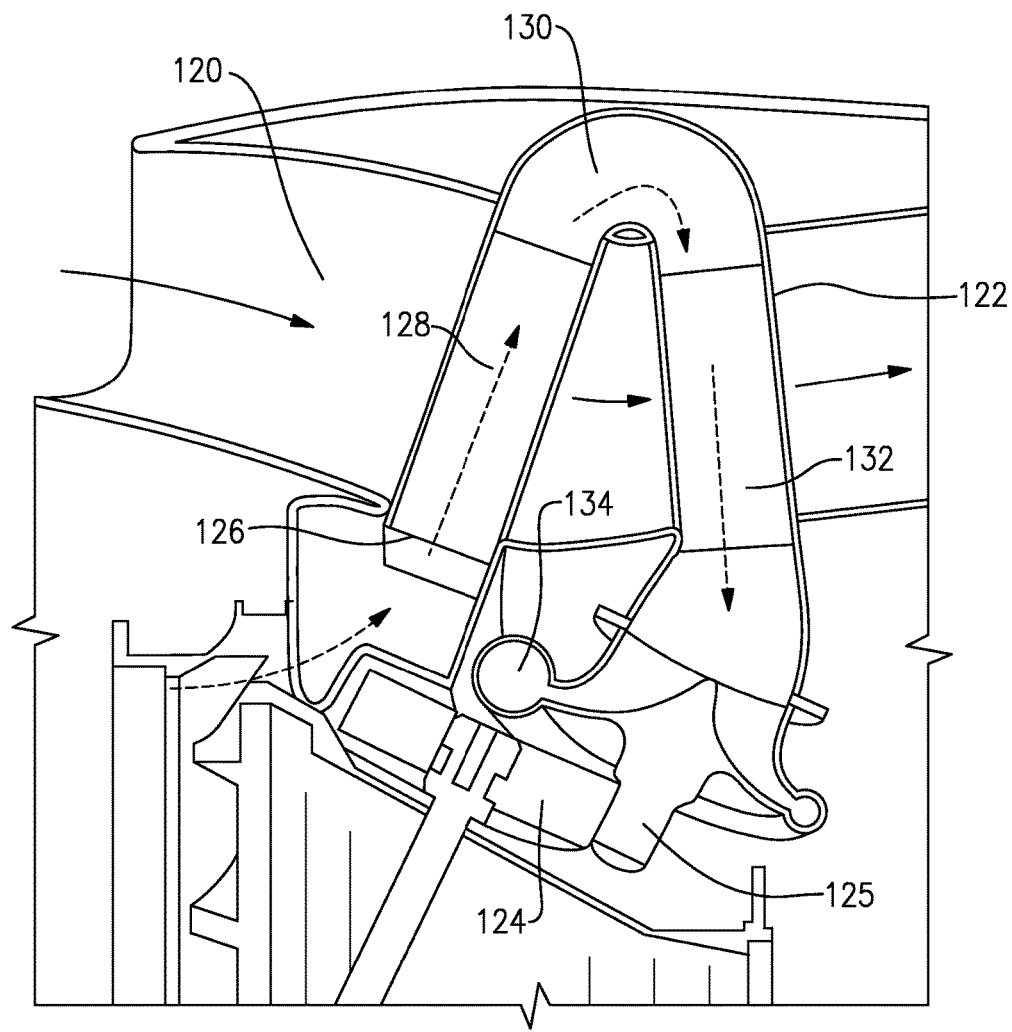
FIG. 4 shows a first embodiment heat exchanger.

FIG. 4 shows a unique heat exchanger structure. A bypass duct 120 receives the heat exchanger 122. A drive 124 drives compressor impeller 125. Impeller 125 is a centrifugal impeller. An inlet 126 receives air, which may be from the low pressure compressor, and delivers that air into a first heat exchanger pass 128 where it is cooled by the bypass air. The air then turns through an elbow 130 into a second pass 132 before reaching the impeller 125. From the impeller 125, the air is discharged at outlet 134, and then passes to the turbine as in the above embodiments.

Figure 5:
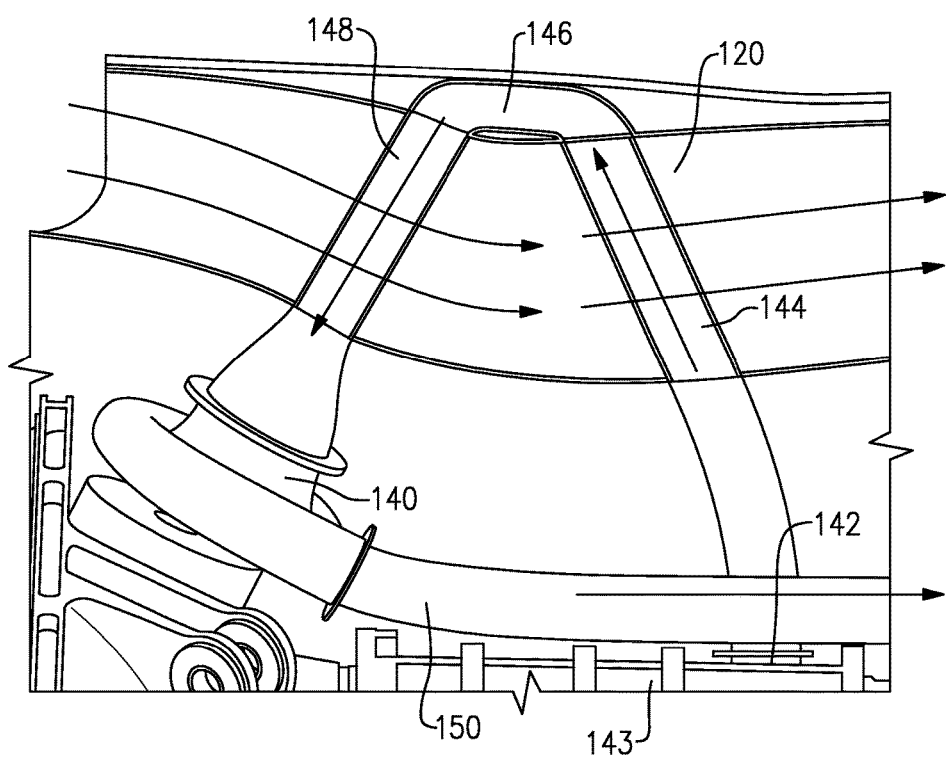
FIG. 5 shows a second embodiment heat exchanger.

FIG. 5 shows another embodiment wherein the cooling compressor 140 receives relatively hot air from an intermediate location 142 in the high pressure compressor 143. The air passes through a first pass 144, an elbow 146, and then a second pass 148 before reaching the compressor 140. The air is then delivered into a conduit 150 and passes to the high pressure turbine.

With this second embodiment, the cooling will be more effective, although the air conduits may be somewhat longer.

In both embodiments, the first pass is radially outward and the second pass is radially inward.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising;
   a main compressor section having a downstream most end, and more upstream locations;
   a turbine section having a high pressure turbine;
   a tap tapping air from at least one of said more upstream locations in said compressor section, and where said air is at a pressure that is lower than a pressure at said downstream most end, passing said tapped air through a heat exchanger and then to a cooling compressor, said cooling compressor compressing air downstream of said heat exchanger, and delivering air into said high pressure turbine; and
   said heat exchanger having at least two passes, with one of said passes passing air radially outwardly, and a second of said passes returning the air radially inwardly to the cooling compressor.

2. The gas turbine engine as set forth in claim 1, wherein a main fan delivers bypass air into a bypass duct and into said main compressor section and said heat exchanger positioned within said bypass duct to be cooled by bypass air.

3. The gas turbine engine as set forth in claim 2, wherein said cooling compressor includes a centrifugal compressor impeller.

4. The gas turbine engine as set forth in claim 3, wherein said first pass is positioned upstream of said second pass in said bypass duct.

5. The gas turbine engine as set forth in claim 2, wherein said first pass is positioned upstream of said second pass in said bypass duct.

6. The gas turbine engine as set forth in claim 2, wherein said at least one of said more upstream locations is in a high pressure compressor.

7. The gas turbine engine as set forth in claim 2, wherein said at least one of said more upstream locations is in a low pressure compressor.

8. The gas turbine engine as set forth in claim 1, wherein an auxiliary fan is positioned upstream of the heat exchanger.

9. The gas turbine engine as set forth in claim 1, wherein said at least one of said more upstream locations is in a high pressure compressor.

10. The gas turbine engine as set forth in claim 1, wherein said at least one of said more upstream locations is in a low pressure compressor.

\* \* \* \* \*